United States Patent Office 3,583,920
Patented June 8, 1971

3,583,920
METHOD OF PREVENTING CAVITATION DAMAGE WITH FUNCTIONAL FLUIDS CONTAINING LOWER ALKANES
Neal W. Furby, Berkeley, Douglas Godfrey, San Rafael, and Robert L. Peeler, Albany, Calif., assignor to Chevron Research Company, San Francisco, Calif.
No Drawing. Filed June 24, 1968, Ser. No. 739,186
Int. Cl. C09k *3/00;* C10m *3/40;* C23f *11/10*
U.S. Cl. 252—78                                    9 Claims

ABSTRACT OF THE DISCLOSURE

Functional fluid containing a minor amount of an alkane of from 1 to 5 carbon atoms as a cavitation damage-inhibiting additive.

BACKGROUND OF THE INVENTION

Functional fluids of various types are employed for numerous purposes. Illustrative of the functions served are lubrication, cooling and quenching, and most important, energy transmission. In all of these uses, it is quite important that the materials perform their indicated function, e.g., power transmission, and that the fluids themselves do not contribute to either chemical or mechanical attack upon the equipment in which they are employed. Such equipment generally is illustrated by pumps, valves, transmission lines, reservoirs, etc. Chemical attack is usually corrosion, including either oxidative or some other form of chemical attack by the fluid itself upon metal and other surfaces of the equipment. Mechanical attack which often occurs is usually manifested by erosion of the solid parts and ordinarily accompanies cavitation in the fluid. Cavitation results when a fluid at a given pressure moves toward a lower pressure with an accompanying increase in fluid velocity. The theory is that when the pressure drop reaches a certain level, and the level, of course, varies with the inherent characteristics of the fluid, the fluid cavitates, and subsequent cavity collapse damages various parts of the fluid carrying system, usually those parts located downstream from the point at which the pressure drop occurs.

Thus, the effect of cavitation upon the mechanical parts of various systems is often quite severe, and, as well, there also often results breakdown of the functional fluid itself. Short life for the fluid with consequent frequent system changes will result. The effects upon mechanical parts include decrease in strength of various components such as pumps (especially impellers and valve plates) and servovalves. Erosion of the valves often results in excessive leaking and possible complete breakdown of the valves with ultimate serious effects. Additionally, the metal fragments which are eroded from the metal parts often enter the fluid and cause decreased lubrication and actual friction wear of many other tightly fitting or moving parts. Other effects which often results include clogging of the filters and as previously noted, degradation of the fluid itself, resulting in short life for the fluid because of increased viscosity, acid number, insoluble materials, chemical activity, etc.

Recent developments in the aircraft industry, with the increased use of high pressure hydraulic systems, have focused attention upon the problem of damaging effects from cavitation. These effects have been especially noticeable in the case of systems which employ phosphate ester fluids. It has recently been disclosed that the operation of a hydraulic system with a completely dry fluid produced greater cavitation damage than when the system was operated with fluid which was contaminated with water. From these facts, it was deduced that the presence of a small amount of water in the system retarded somewhat the damage resulting from cavitation erosion. The effectiveness of water in reducing the damage, however, is somewhat limited, and the degree of protection against damage afforded is comparatively small.

SUMMARY

It has now been found that the inclusion of a minor amount of an alkane of from 1 to 5 carbon atoms in functional fluid compositions results in a highly significant decrease in the amount of cavitation erosion and damage to systems in which the fluid compositions are employed.

The alkanes may be straight or branched. Thus suitable materials include methane, ethane, propane, n-butane, 2-methylpropane, n-pentane, and 2-methylbutane. The preferred additives are $C_3$–$C_4$ alkanes.

DESCRIPTION

The amount of the alkane which must be added to each functional fluid in order to effectively prevent cavitation damage depends upon the nature of the functional fluid. The prospensity of various fluids for promoting cavitation damage varies greatly with the character of the fluid. For example, mineral oil based materials are generally quite low in promoting cavitation damage while the phosphate ester based materials have been found to be quite high in their cavitation damage producing characteristics. Thus, the amount of alkane required in a phosphate ester will generally be significantly higher than in a mineral oil. Additionally, a limiting factor in the amount of material that may be introduced results from the solubility of the normally liquid alkanes in the various base materials. In general, an amount near solubility at 1 atmosphere pressure is preferred to prevent cavitation damage in most fluids, although, as data will show, amounts lower than 0.1 weight percent are somewhat effective. The minimum concentration of alkane will be 0.05 percent by weight.

The gaseous additives are added by passing the gas through the fluid until the fluid is wholly saturated, or is partially saturated to a degree necessary to control cavitation damage.

During operation of the particular system which is to be protected, the level of alkane necessary to protect the system may be maintained, if necessary, by addition of liquid or gaseous additive, for example from a cylinder. Thus within the scope of the invention is the method of preventing cavitation damage to a hydraulic system by means of maintaining in the fluid employed in the system a concentration of the alkane sufficient to inhibit cavitation damage.

The functional fluids in which the additives of this invention are employed include a wide variety of base materials including esters of phosphorus acids, mineral oils, synthetic hydrocarbon oils, silicates, silicones, monoesters, dicarboxylic acid esters, chlorinated biphenyls, esters of polyhydric materials, aromatic ethers, thioethers, etc.

The most common phosphorus acid esters which are used are the triesters of orthophosphoric acid. The three classes of materials are trialkyl phosphates, triaryl phosphates, and mixed alkyl-aryl phosphates. The esters may be represented by the following formula:

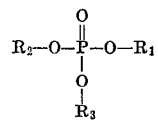

wherein $R_1$, $R_2$ and $R_3$ are alkyl, aryl, substituted aryl, or substituted alkyl groups.

Alkyl groups which may be employed include methyl, ethyl, propyl, isopropyl, n-butyl, isobutyl, sec.-butyl, tert.-butyl, n-amyl, isoamyl, 2-methylbutyl, 2,2-dimethylpropyl, 2-amyl, 3-amyl, 1,2-dimethylpropyl, tert.-amyl, n-hexyl, 2-hexyl, 3-hexyl, 1,2,2-trimethylpropyl, 3,3-dimethylbutyl, 1,1,2-trimethylpropyl, 2-methylamyl, 1,1-dimethylbutyl, 1-ethyl-2-methylpropyl, 1,3-dimethylbutyl, isohexyl, 3-methylamyl, 1,2-dimethylbutyl, 1,2-dimethyl-1-ethylpropyl, 1,1,2-trimethylbutyl, 1-isopropyl-2-methylpropyl, 1-methyl-2-ethylbutyl, 1,1-diethylpropyl, 2-methylhexyl, 1-isopropylbutyl, 1-ethyl-3-methtylbutyl, 1,4-dimethylamyl, isoheptyl, 1-ethyl-2-methylbutyl, n-octyl, 2-octyl, 1,1-diethyl-2-methylpropyl, 1,1-diethylbutyl, 1,1-dimethylhexyl, 1-methyl-1-ethylamyl, 2-ethylhexyl, 6-methylheptyl, n-nonyl, 2-nonyl, 3-nonyl, 1,1-dimethtylheptyl, 1,1-diethyl-3-methylbutyl, diisobulylmethyl, 3,5-dimethylheptyl, n-decyl, 4-decyl, 1,1-dipropylbutyl, 2-isopropyl-5-methylhexyl, undecyl, n-dodecyl, n-tridecyl, n-tetradecyl, n-hexadecyl, etc.

Substituted alkyl groups may also be employed. Thus the alkyl materials may be substituted with halogens, especially chlorine and fluorine, and with alkoxy groups, etc. Examples of the substituted alkyl groups include butoxyethyl, benzoxyethyl, 2-chloroethyl, 2-fluoroethyl, etc.

Examples of suitable aryl radicals which my be used in the triaryl and mixed alkyl-aryl phosphates include phenyl, xylyl, cresyl and halogenated phenyl. A commonly used halogenated aryl material is orthochlorophenyl.

In addition to the oxy esters of phosphoric acid, amides and thioesters may be employed. The dibasic acid esters which are used as functional fluids, esters derived from sebasic, adipic, and azelaic acids are most commonly used. Suberic, hydroxysuccinic, fumaric, maleic, etc. are sometimes used. The alcohols employed are usually long chain materials such as octyl, decyl, dodecyl, and various oxo alcohols. Short chain alcohols such as butyl, amyl, hexyl, etc., may also be employed. Aromatic alcohols such as benzyl and substituted benzyl alcohols may also be used.

The silicones which are employed as functional fluids may be represented by the following formula:

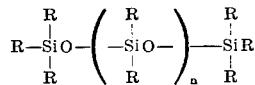

wherein the R's may be the same or different organic groups. $n$ may represent a small digit or a very large number.

The most important commercial materials are the dimethyl silicone fluids; however, other fluids are available with alkyl, substituted alkyl, aryl and substituted aryl groups. Examples of other available substituents are dimethyl, phenylmethyl, phenyl, chlorophenyl, trifluoropropylmethyl, trifluoropropylmethyl dimethyl, etc. The siloxanes are available in various lengths from dimers, trimers, etc. to low, medium and high polymers. Thus in the case of dimethyl polysiloxanes, the materials have a molecular weight of from 162 to 148,000.

Silicate esters are also employed as functional fluids. The materials called orthosilicate esters can be considered to be the reaction product of silicic acid, $Si(OH)_4$ and an alcohol or phenol. The structural formula may be represented as follows:

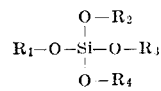

where the R's may be the same or different organic the phosphate esters previously discussed, the materials may generally be classified as tetraalkyl, tetraaryl and mixed alkyl-aryl orthosilicates. The organic groups may be substituted by chloro, nitro, fluoro, alkoxy, and thioalkoxy, etc., groups.

Related materials which are available are called "dimersilicates" and may be named hexaalkoxy or hexaaryloxy disiloxanes. Typical orthosilicates include tetra (2-ethylbutyl), tetra(2-pentyl), tert.-butyl tri(2-ethylhexyl), tert.-butyl tri(2-octyl), tert.-butyl tri(5-ethyl-2-nonyl), di(tert.-butyl) di(2-ethylhexyl), di(tert.-pentyl) di(2-ethylhexyl), di(tert.-butyl) di(2-pentyl), tri(tert.-butyl)-2-ethylhexyl, tetra-n-propyl, tetra-n-1,1,3-trihydropropforyl, tetra-n-1,1 - dihydropropforyl, tetra-n-butyl, tetra-n-amyl, tetra-n-1,1,5-trihydropropforyl, tetra-2-ethylhexyl derivatives.

Another class of functional fluids which may be employed include the polyphenyl ethers. Examples of these materials include bis(p-phenoxyphenyl) ether, bis(o-phenoxyphenyl) ether, bis(m-phenoxyphenyl) ether, m-phenoxyphenyl-p-phenoxyphenyl ether, m-phenoxyphenyl-o-phenoxyphenyl ether, bis(mix-phenoxyphenyl) ether, p-bis(p-phenoxy) benzene, mix - bis(mix-phenoxyphenoxy) benzene, bis[p-(p-phenoxyphenoxy)phenyl] ether, mi-bis[m-phenoxyphenoxy)phenoxy] benzene, and bis [p-(p-[p-phenoxyphenoxy]phenoxy)phenyl] ether. (the prefix "mix" indicates a mixture of isomers having varied linkage orientation. See Gunderson, Synthetic Lubricants (New York, Reinhold Publ. Co.: 1962), page 411, note b.) The phenyl groups and the polyphenyl ether may be substituted by various substituents including methyl, ethyl, n-propyl, iso-propyl, tert.-butyl, n-octyl, cyclohevyl, cyclopentyl, chloro, bromo, hydroxyl, methoxyl, cumyl, etc.

Hydrocarbon oils, including natural mineral oils obtained from petroleum and synthetic hydrocarbons, are also a suitable base material. The mineral oils include a wide variety of naphthenic or paraffin base oils.

Synthetic oils which are employed include alkylated waxes, alkylated hydrocarbons or relatively high molecular weight, hydrogenated polymers of hydrocarbons and condensation products of chlorinated alkyl hydrocarbons with aryl compounds. Other suitable oils are those obtained by polymerization of low molecular weight alkylene oxides such as propylene and/or methylene oxide. Still other synthetic oils obtained by etherification and/or esterification of the hydroxy groups and alkylene oxide polymers, such as, for example, the acetate of the 2-ethylhexanol-initiated polymer of propylene oxide.

Mixtures of the above-mentioned fluids may be employed as well as the pure substances.

The following examples serves to illustrate the invention. The example, however, is but illustrative and is non-limiting.

EXAMPLE

Cavitation damage prevention

The damage from cavitation by a phosphate ester and a mineral oil functional fluid was determined by means of a thin film cavitation apparatus. Briefly, the test involves vibrating an ultrasonic probe within a very small distance of a metal specimen while both probe and specimen are immersed in the subject fluid. Power is applied and the apparatus is allowed to operate for a specified period. The specimen is then removed and weight loss during the test is determined.

More specifically, the apparatus employed is a 0.5 inch diameter ultrasonic probe which is caused to vibrate axially in the liquid at 20 kcs. with an amplitude of approximately 0.0002 inch, with the flat end 0.010 inch from a metal specimen. The probe employed is of the self-tuning piezoelectric type, delivering 92% of the 125 watt power input to the tip. The probe is fastened to the movable portion of a precision way which is mounted on a massive steel post and base. A precision dial gauge allows film thickness adjustment to 0.0001 inch.

The probe and specimen are located within a 50 ml. cell in which the test fluid is placed. For testing with a circulating liquid a cell may be employed which is equipped with an inlet and outlet connected with a reservoir and pump. The metal specimens employed in the following tests were ¼" thick, 1" diameter copper cylinders or cast iron segments.

The tests are performed as follows: the copper specimens are abraded on successively finer metallographic polishing paper to 3/0, ending with random scratches, followed by ultrasonic cleaning in hexane and then pentane followed by rapid drying in a blast of warm air to prevent moisture condensation. The specimen is placed in the cell which is filled with the functional fluid sample and the fluid film thickness is set by the use of a feeler gauge. With copper the tests were run for 30 minutes; with cast iron specimens, they were run for 3 hours. Specimen damage was measured by weight loss, increased surface roughness, and the observation of discoloration and microscopic pits. The cast iron was used without surface preparation.

The phosphate ester employed was a material consisting primarily of dibutyl phenyl phosphate (about 70%) containing minor portions of butyl diphenyl phosphate and tributyl phosphate. The fluid contained about 6% of an ester type viscosity index improver, minor amounts of corrosion and oxidation inhibitors and a silicone antifoam agent.

The phosphate fluid used in the test had the following properties:

Viscosity, c.p.s.:
   $100°$ F. _____ 12
   $210°$ F. _____ 3.9
Specific gravity, $77°$ F. _____ 1.065
Autogenous ignition temperature, $°$ F. _____ 1100
Flash point, $°$ F. _____ 360

The mineral oil base fluid was a commercially available gas engine oil. The gaseous materials were added by bubbling them through the liquid samples for a period of 20 minutes, at which time significant weight increase had ceased.

The tests were performed according to the above procedure with various portions of the alkanes dissolved. Comparison tests were performed on dry fluids and on samples containing water. These data are set forth in the table, following:

TABLE.—THIN FILM CAVITATION EROSION TESTS EMPLOYING $C^1$-$C^5$ ALKANES AS DAMAGE REDUCING ADDITIVES

| Additive | Phosphate ester base (30 min. test) | | Mineral Oil base (3 hr. test) | |
|---|---|---|---|---|
| | Additive conc., wt. percent | Wt. copper loss, mg. | Additive conc., wt. percent | Wt. cast iron loss, mg. |
| None | | 15.27 | | 0.85 |
| Water | 0.5 | 13.10 | | |
| Methane | <0.1 | 6.62 | <0.1 | 0.57 |
| Ethane | 0.14 | 0.68 | 0.075 | 0.55 |
| Propane | 1.00 | 0.06 | 0.31 | 0.39 |
| Butane | 0.85 | 5.50 | 1.15 | 0.09 |
| Pentane¹ | 5.0 | 0.06 | 5.00 | 0 |
| Hexane¹ | 5.0 | 10.10 | 5.00 | 1.60 |

¹ Liquid added.

These data show the surprising effectiveness of the materials in reducing damage caused by cavitation erosion. It may be noted that propane was at least 100 times as effective in reducing the degree of damage in the phosphate ester base as water. It may also be seen that while pentane is quite effective in reducing damage in both bases, hexane is only slightly effective in the phosphate, and is detrimental in the mineral oil.

The alkanes are effective in preventing cavitation damage in numerous applications. Such damage rises not only in hydraulic systems, but in almost any system in which a liquid is pumped under considerable pressure, for example in lubricating systems, etc.

In addition to the cavitation erosion inhibitors of this invention, the functional fluids, dependent upon the particular use for which the fluid is employed, may contain a variety of additional conventional additives such as oxidation inhibitors, detergents, or dispersants, sludge inhibitors, pour depressants, V.I. improvers, rust inhibitors, oiliness agents, wear inhibitors, antifoaming agents, dyes, etc.

What is claimed is:

1. A power transmission fluid consisting essentially of a major portion of a fluid base selected from the group consisting of an ester or amide of a phosphorus acid, a silicate ester, a silicone, or a polyphenyl ether having a tendency to cause cavitation damage, and in an amount of from about 0.05 weight percent to about the amount soluble at a pressure of about 1 atmosphere, a minor portion of an alkane of 1 to 5 carbon atoms.

2. The fluid of claim 1, in which the alkane has from 2 to 5 carbon atoms.

3. The fluid of claim 1, in which the fluid base is a phosphate ester.

4. The fluid of claim 3, in which the phosphate ester is a mixed alkyl-aryl ester.

5. The fluid of claim 4, in which the mixed alkyl-aryl phosphate ester is dibutyl phenyl phosphate.

6. In a method of transmitting power which consists of applying force to a power transmission fluid selected from the group consisting of an ester or amide of a phosphorus acid, a silicate ester, a silicone, or a polyphenyl ether, the improvement which comprises incorporating into said fluid an alkane of from 1 to 5 carbon atoms in said fluid in an amount of from about 0.05 weight percent up to about the amount soluble at a pressure of 1 atmosphere to prevent cavitation damage.

7. The method of claim 6, in which the base consists essentially of a phosphate ester.

8. The method of claim 7 in which the phosphate ester is a mixed alkyl-aryl phosphate.

9. The method of claim 8, in which the mixed alkyl-aryl phosphate is dibutyl phenyl phosphate.

References Cited

UNITED STATES PATENTS

| | | | |
|---|---|---|---|
| 2,524,590 | 10/1950 | Boe | 252—305 |
| 3,321,397 | 5/1967 | Meyers | 208—351 |
| 3,513,097 | 5/1970 | Langenfeld | 252—78 |

OTHER REFERENCES

"The Electrochemical Approach to Cavitation Damage and its Prevention," H. S. Preiser and B. H. Tytell (1961) vol. 17, "Corrosion," pp. 535T–541T.

"Cavitational Erosion and Means for its Prevention," I. N. Bogachez and R. I. Mints, U.S. Clearing House, pp. 99–112.

LEON D. ROSDOL, Primary Examiner

D. SILVERSTEIN, Assistant Examiner

U.S. Cl. X.R.

252—32.5, 33.6, 59, 75, 389

FO-1050
(5/69)

UNITED STATES PATENT OFFICE
CERTIFICATE OF CORRECTION

Patent No. 3,583,920      Dated June 8, 1971

Inventor(s) NEAL W. FURBY ET AL.

It is certified that error appears in the above-identified patent and that said Letters Patent are hereby corrected as shown below:

Col. 2, line 23, "prospensity" should read --propensity--.

Col. 3, line 16, "diisobulyl" should read --diisobutyl--.

Col. 3, line 26, "my" should read --may--.

Col. 3, line 70, "where the R's may be the same or different organic" should read --where $R_1$, $R_2$, $R_3$ and $R_4$ are organic groups. Similar to--.

Col. 4, line 20, "mi-bis/$\overline{m}$-phenoxyphenoxy)" should read --m-bis/$\overline{m}$-(m-phenoxyphenoxy)--.

Col. 4, line 27, "cyclohevyl" should read --cyclohexyl--.

Col. 4, line 34, "or" should read --of--.

Col. 5, line 44, "$C^1-C^6$" should read --$C_1-C_6$--.

Col. 5, line 55, "0.06" should read --0.60--.

Signed and sealed this 28th day of December 1971.

(SEAL)
Attest:

EDWARD M. FLETCHER, JR.      ROBERT GOTTSCHALK
Attesting Officer            Acting Commissioner of Patents